United States Patent [19]
Itzkan et al.

[11] 3,967,211
[45] June 29, 1976

[54] LASER WAVELENGTH STABILIZATION

[75] Inventors: Irving Itzkan, Boston; Charles T. Pike, Lexington, both of Mass.

[73] Assignee: Jersey Nuclear-Avco Isotopes, Inc., Bellevue, Wash.

[22] Filed: Jan. 17, 1974

[21] Appl. No.: 434,078

[52] U.S. Cl. .......................................... 331/94.5 S
[51] Int. Cl.² ........................................... H01S 3/13
[58] Field of Search ................ 331/94.5; 356/106 R

[56] References Cited
UNITED STATES PATENTS 3,395,365  7/1968  Fork ............................... 331/94.5 S
3,543,181  11/1970  Lee et al ........................ 331/94.5 S Primary Examiner—William L. Sikes
Attorney, Agent, or Firm—Weingarten, Maxham & Schurgin

[57] ABSTRACT

A system for stabilizing the frequency of a laser employing the variation in position of interference patterns which results from a variation in laser beam frequency in passing through a Fabry Perot etalon filter. The system is particularly useful for maintaining strict frequency control at a particular frequency in the output of a tunable laser such as a dye laser for use in isotope separation.

16 Claims, 4 Drawing Figures

U.S. Patent   June 29, 1976   3,967,211
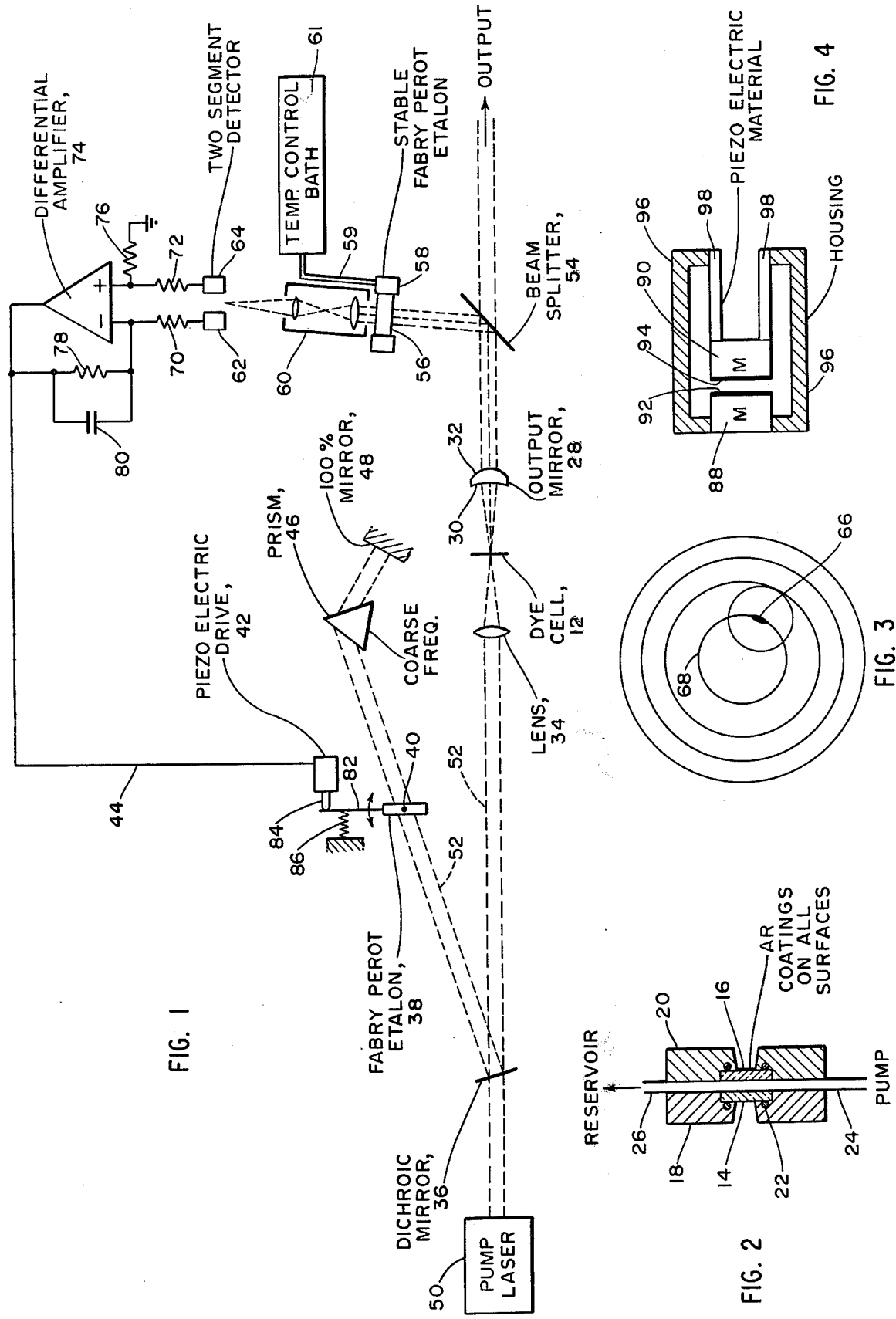

LASER WAVELENGTH STABILIZATION

FIELD OF THE INVENTION

This invention relates to laser wavelength stabilization and in particular to a system for precisely maintaining laser beam frequency at an isotope absorption line.

BACKGROUND OF THE INVENTION

There is described in U.S. Pat. No. 3,772,519, assigned to the same assignee as the present application and specifically incorporated herein by reference, a system for isotope separation, in particular uranium enrichment which produces isotopically selected photoionization of the $U_{235}$ isotope in a uranium vapor and acceleration of the ionized particles, by crossed-field magnetohydrodynamic techniques, onto distinct trajectories for separate collection. The photoionization is achieved with laser radiation typically employing the isotopically selective frequency for selective photoexcitation and one or more additional radiations to produce ionization from the excited state.

In order that the efficiency of the isotopically selective photoionization be maintained as high as possible, it is important to control the frequency of at least the laser producing isotopically selective photoexcitation to keep it from deviating from the selected $U_{235}$ absorption line and prevent excitation of other undesired isotopes, typically $U_{238}$. The higher the spectral accuracy and stability of radiation employed for photoexcitation, the greater is the number of $U_{235}$ particles which are photoexcited and the smaller the number of other isotope type particles which are photoexcited.

While laser frequency stabilizers per se are known as, for example, shown in U.S. Pat. No. 3,740,664, special requirements exist in the isotope separation applications. The absorption lines for the $U_{235}$ and $U_{238}$ isotopes are typically separated by a fraction of a wave number in many cases. Additionally, relatively high photon densities are desirable in the laser radiation for higher enrichment yield, placing a further demand upon the laser system.

BRIEF DESCRIPTION OF THE INVENTION

In accordance with the preferred embodiment of the present invention, a system for laser wavelength stabilization is provided which is particularly useful in the context of a system for providing isotopically selective photoionization for isotope separation. In this particular embodiment of the invention, a tunable dye laser is used and has its laser radiation stabilized for the selected isotope absorption line by using a feedback path in which a portion of the laser radiation is separated from the main beam and passed through a temperature stabilized Fabry Perot etalon filter. A selected line of the interference pattern which results from passage of the beam through the stable etalon filter is imaged between a pair of photodetectors which, in turn, provide inputs to a laser frequency servo system. The servo includes differential gain devices responding to the photodetector signals and whose output signal represents the position of the interference pattern line with respect to the photodetector pair. Since the interference pattern shifts with frequency, the amplifier output corresponds to laser radiation frequency. The electrical output of the amplifier is employed in a fast response electro-mechanical drive mechanism such as a piezoelectric crystal which, in turn, adjusts the angle or separation of a further Fabry Perot etalon filter in the dye laser cavity to thereby adjust the frequency output of the dye laser.

The frequency output of the dye laser is roughly adjusted by intra-cavity elements, while the external frequency detecting characteristic of the stable Fabry Perot etalon provides the fine frequency control. This feedback loop configuration provides control over the frequency wherein the only error significance which creeps into the system is a result of the stability of the Fabry Perot etalon filter. An etalon filter of very high stability is achieved to insure accurate control over the laser frequency and correspondingly high isotope separation efficiency.

BRIEF DESCRIPTION OF THE DRAWINGS

These and other features of the present invention are more fully described below in the detailed description of the preferred embodiment and in the accompanying drawings of which:

FIG. 1 is a system diagram illustrating the components of the laser cavity and stabilizing system of the present invention;

FIG. 2 is a detailed view of a typical dye laser cell for use in the FIG. 1 system;

FIG. 3 is a representation of an interference pattern which is produced in the laser stabilization system of FIG. 1; and FIG. 4 is a detailed structural diagram of a controllable filter for alternative use in adjusting the laser frequency in the system of FIG. 1.

DETAILED DESCRIPTION OF THE PREFERRED EMBODIMENT

The present invention contemplates in a preferred embodiment a system for stabilizing the beam output frequency of a tunable dye laser. The stabilization system is of utility in any radiant energy system having a tuned cavity, although it is of particular utility in laser induced isotope separation where for high yield efficient uranium enrichment, accurately maintained laser radiation wavelength is required.

With respect to FIG. 1, the components of a wavelength stabilized laser system according to the invention are illustrated and include, typically, a tunable dye laser and cavity along with a feedback stabilization system for the laser radiation. In particular, a dye cell 12 contains a dye solution which forms the lasing medium and is associated with a cavity and tuning means to control the lasing frequency preferably for use in isotopically selective photoexcitation of uranium $U_{235}$. The dye cell 12 is illustrated in greater detail in FIG. 2 and is shown to comprise first and second cell windows 14 and 16 having anti-reflective coatings thereon at the frequency of the desired laser radiation and held together through compression plates 18 and 20 and O-ring seals 22. The dye used in the dye cell 12 as the lasing medium enters and exits the region between plates 14 and 16 in a continuous flow from a pump to a reservoir, not shown, through respective conduits 24 and 26.

Returning to FIG. 1, the lasing cavity in addition to dye cell 12 includes an output mirror 28 having a partially reflective concave surface 30 and a convex exterior lens 32 for divergence control on the laser beam. On the other side of cell 12, a lens 34 is also provided in the laser beam path to recollimate the radiation from cell 12 for reflection through the cavity. A dichroic mirror 36 is placed in the cavity and reflects the recollimated radiation through a controlled Fabry Perot etalon filter 38 which may typically be pivoted about a central axis 40 and rotationally controlled by a piezoelectric element 42 in response to a signal on a line 44. The Fabry Perot filter typically comprises a set of fused silica windows placed parallel to define a cavity, with transmissivity increasing at cavity resonance points. The radiation passing through the Fabry Perot filter 38 will be fine tuned in frequency in correspondence with the angle of the etalon filter 38 as explained below. The cavity further includes a prism 46 on the far side of filter 38 and a fully reflecting mirror 48 which together provide a rough frequency definition of the laser radiation from the dye cell 12.

Excitation radiation to invert the energy state populations in the dye in cell 12 to a lasing condition is provided from a laser pump 50. Laser pump 50 is typically an argon laser having a frequency for its output radiation substantially different from the dye cell radiation as defined by the cavity. The laser pump 50 will typically have a higher frequency so that the excited dye will lase through a decay to an energy level above the ground level. This frequency difference allows passage of radiation from the argon pump 50 through the dichroic mirror 36 for superposition upon the beam 52 of laser radiation within the cavity between mirrors 48 and 28. The superimposed argon laser radiation excites the dye medium in cell 12 to an excited energy condition. The particular transition to a narrow range of one or more lower level states is defined by the frequency to which the cavity is tuned, typically chosen to correspond to an isotope absorption line for uranium enrichment. In accordance with this system, the lasing frequency will be narrowly defined and correspond to a particular absorption line for the desired isotope without correspondingly encompassing a neighboring absorption line for other isotope types. Appropriate absorption lines for this purpose may be selected from published tabulations and generally lie in the red or orange portion of the visible spectrum. Typically, the difference between absorption lines for the $U_{235}$ and $U_{238}$ isotopes in this portion of the visible spectrum may be as little as a fraction of a wave number (the number of wavelengths in a centimeter). For this long term, continuous or production level operation of such a system, stabilization of the laser radiation frequency will greatly enhance separation efficiency.

For this purpose, the output of the dye laser cavity through the output mirror 28 is directed through a beam splitter 54 as output radiation for utilization, typically in the uranium enrichment equipment described in the above-mentioned U.S. Pat. No. 3,772,519 specifically incorporated herein by reference. The beam splitter 54 samples a portion, typically a small percentage, of the radiation in the output beam and directs it through a stable Fabry Perot etalon filter 56. Filter 56 has a temperature control jacket 58 fed through tubing 59 from a temperature control bath 61. The bath is regulated to control the etalon filter temperature to within preferably a 0.1° centigrade temperature variation.

The etalon filter 56 will typically include a spacer between filter mirrors or, generally, windows. The spacer is preferably formed of an ultra low expansion titanium silicate which may be commercially obtained with an expansion coefficient of approximately $3 \times 10^{-8}/°C$ at room temperature. Where temperature control of 0.1°C is achieved, stability is better than one part in $10^8$ or $6 \times 10^{-5}$ angstroms in the approximate range of 6,000 angstroms.

The sampled radiation after passing through the etalon produces an interference pattern, illustrated in FIG. 3, when imaged by a telescope 60 to a focus between a pair of photodetectors 62 and 64.

With reference to FIG. 3, the interference pattern produced by the Fabry Perot etalon is illustrated as a set of Fabry Perot interference rings 68 whose spacing decreases with increasing radius. Due to the optical geometrics involved, each focused fringe will appear as only a small ring section shown as a line 66.

The Fabry Perot etalon filter 56 provides maximum transmissivity at the frequency and transmission angle for which an integral number of half wavelengths fit between the filter windows. Accordingly, several discrete angles will provide maximum transmissivity at any given frequency leading to the pattern of rings 68. As the frequency of incident radiation is varied, the position of rings 68 will change radially due to different discrete angles at which maximum transmissivity occurs. The field of view of the lens 60 selects a short line section, a spot, 66 of one ring to focus to a point between photodetectors 62 and 64. Typically, the photodetectors are separated along a radial line of the pattern of rings 68.

The output of the detectors 62 and 64 is applied through respective input resistors 70 and 72 to inverting and noninverting inputs of a differential amplifier 74, which may include one or more stages of amplification. The noninverting input is biased to ground through a resistor 76, while the inverting input receives a further signal from a feedback path consisting of a gain determining resistor 78 in parallel with a frequency stabilizing capacitor 80.

The output of the amplifier 74 is applied to the piezoelectric drive mechanism 42 through line 44. A pivot arm 82 on the etalon filter 38 is directed against a mechanical output shaft 84 from the piezoelectric drive 42 and may be resiliently urged against it by a spring 86.

As an alternative to the rotationally controlled etalon filter 38, a filter shown in FIG. 4 may be used. This filter comprises first and second mirrors or windows 88 and 90 which have respective coatings 92 and 94 on inner facing surfaces. The mirrors 88 and 90 are held parallel by a construction consisting typically of rigid cylindrical arm 96 attached to mirror 88 and which extends a distance beyond the mirror 90. A piezoelectric material 98, which may be cylindrically shaped, supports the mirror 90 from the point of extended reach of the arm 96. In such case, the spacing between the mirrors 92 and 94 is controlled by the signal from amplifier 74 which is applied to vary the axial length of piezoelectric element 98.

The above-disclosed stabilization system depends for its frequency accuracy upon the stability of the Fabry Perot etalon filter 56. This is achieved in the preferred embodiment through the use of a high temperature stability spacer for the Fabry Perot mirror plates and temperature control of the filter as a whole.

The system also eliminates the need for a jitter or AC modulation in the laser beam in order to develop an error signal for use in frequency control. It provides an extremely accurate laser stabilization system which is particularly useful for the degree of frequency control desired for uranium enrichment or isotope separation in general. The types of optical components used in the laser cavity for the stabilization system readily lend themselves to large scale utilization for high photon density lasers.

Having described above a preferred embodiment for the present invention, it will appear to those skilled in the art that diverse alterations and modifications to the disclosed apparatus may be achieved within the spirit of the invention. It is accordingly intended to limit the scope of the invention only as indicated in the following claims.

What is claimed is:

1. A wavelength stabilization system for use in a laser comprising:
   a lasing medium;
   means for defining the frequency of laser radiation from said medium;
   means for diverting a portion of laser radiation from said medium;
   means for developing an interference pattern from the diverted laser radiation;
   said developing means causing said interference pattern to vary in position with frequency in said laser radiation;
   means responsive to the position of said interference pattern for developing an electrical signal representative thereof;
   means operative in association with said frequency defining means and responsive to said electrical signal for adjusting the frequency of laser radiation from said lasing medium.

2. The wavelength stabilization system of claim 1 wherein said interference pattern developing means includes a Fabry Perot etalon filter.

3. The wavelength stabilization system of claim 2 further including means for reducing temperature variation in said Fabry Perot etalon filter.

4. The wavelength stabilization system of claim 2 wherein said Fabry Perot etalon filter further includes:
   first and second windows in the path of the diverted radiation; and
   a dimensionally stable solid spacer for said first and second windows.

5. The wavelength stabilization system of claim 4 wherein said spacer comprises titanium silicate.

6. The wavelength stabilization system of claim 1 wherein:
   a dye cell is provided, and
   said lasing medium includes a dye solution flowing through said dye cell.

7. The wavelength stabilization system of claim 1 wherein said frequency adjusting means includes a Fabry Perot etalon filter.

8. The wavelength stabilization system of claim 7 further including:
   means for rotationally supporting said Fabry Perot etalon filter; and
   means for rotating said Fabry Perot etalon filter in response to said electrical signal.

9. The wavelength stabilization system of claim 7 wherein:
   said Fabry Perot filter includes first and second windows; and
   a piezoelectric element is provided responsive to said signal to vary the spacing of said first and second windows.

10. The wavelength stabilization system of claim 1 further including:
    means for exciting said medium to a lasing condition;
    mirror means associated with said frequency defining means for receiving radiation from said medium exciting means at a different frequency from the frequency of radiation from said medium and for passing that radiation into said lasing medium;
    said mirror means being reflective at the frequency of laser radiation from said medium as defined by said defining means.

11. The system of claim 1 further including:
    first and second windows in the path of laser radiation from the laser medium and nonreflective of said laser radiation;
    means for spacing said windows to define a passage therethrough for a stream of said lasing medium; and
    means for applying a stream of said lasing medium to the region between said windows.

12. The wavelength system of claim 1 wherein said frequency defining means includes:
    a cavity for reflecting radiation from said medium; and
    means for providing rough frequency definition of the frequency of radiation in said cavity;
    said frequency adjusting means providing a fine frequency control of the frequency of radiation in said cavity.

13. The system of claim 1 wherein said means for developing an interference pattern includes:
    means for filtering the diverted radiation with an enhanced radiation transmission at a set of frequency dependent angles to provide an interference pattern consisting of a set of concentric rings; and
    means for forming an image of a section of a ring to which section said signal developing means is responsive.

14. A wavelength stabilization system for laser radiation comprising:
    a dye cell having a flow of a laseable dye medium therethrough and having first and second opposed radiation transmissive windows;
    means for defining a cavity for radiation from said dye cell through said first and second windows and including:
        a mirror forming a first reflective end of said cavity; and
        a partially reflecting mirror forming a second reflective end of said cavity;
    means for directing radiation of a different frequency than the radiation from said dye cell for excitation of said dye medium to a lasing condition;
    means responsive to radiation passing through said partially reflecting mirror for providing an isotope separation;
    means for diverting a portion of the radiation passing through said partially reflecting mirror onto a path;
    filter means for filtering the diverted radiation and having first and second at least partially reflecting surfaces separated by a temperature stable spacer in the path of the diverted radiation;
    said filter means providing an interference pattern varying with frequency;
    a temperature controller for the filter means for reducing thermal variation in the interference pattern from said filter means;

first and second photodetectors;

means for imaging a section of said interference pattern over an area between said photodetectors;

means for developing an electrical signal representative of the difference in imaged light received by each photodetector;

further filter means in said cavity for filtering the radiation from said medium and having a transmission angle varying with frequency;

means responsive to said electrical signal for adjusting said further filter means to stabilize the frequency of radiation in said cavity.

15. The wavelength stabilization system of claim 14 wherein said temperature controller includes means for controlling the temperature of said filter means to within a fraction of a degree centigrade.

16. The wavelength stabilization system of claim 15 wherein the means responsive to said electrical signal for adjusting said further filter means includes means for stabilizing the frequency of radiation in said cavity to within a fraction of $10^{-4}$ angstroms.

* * * * *

UNITED STATES PATENT AND TRADEMARK OFFICE
CERTIFICATE OF CORRECTION

PATENT NO. : 3,967,211
DATED : June 29, 1976
INVENTOR(S) : Irving Itzkan and Charles T. Pike It is certified that error appears in the above-identified patent and that said Letters Patent are hereby corrected as shown below:

Column 1, line 20, "the" should read --one--.
Column 6, line 21, "wavelength system" should read --wavelength stabilization system--, Signed and Sealed this Fourteenth Day of June 1977

[SEAL]

Attest:

RUTH C. MASON
Attesting Officer

C. MARSHALL DANN
Commissioner of Patents and Trademarks